(12) United States Patent
Zeeb et al.

(10) Patent No.: US 10,543,896 B2
(45) Date of Patent: Jan. 28, 2020

(54) DECOMPRESSION DEVICE

(71) Applicant: Premium Aerotec GmbH, Augsburg (DE)

(72) Inventors: Sergej Zeeb, Augsburg (DE); Sergiu Irimie, Augsburg (DE); Matthias Leidescher, Koenigsrunn (DE); Peter Tyroller, Kuehbach (DE)

(73) Assignee: Premium Aerotec GmbH, Augsburg (DE)

( * ) Notice: Subject to any disclaimer, the term of this patent is extended or adjusted under 35 U.S.C. 154(b) by 361 days.

(21) Appl. No.: 15/478,686

(22) Filed: Apr. 4, 2017

(65) Prior Publication Data

US 2017/0291674 A1    Oct. 12, 2017

(30) Foreign Application Priority Data

Apr. 8, 2016 (DE) .......................... 10 2016 205 894

(51) Int. Cl.
*B64C 1/00* (2006.01)
*B64C 1/06* (2006.01)
*B64C 1/18* (2006.01)

(52) U.S. Cl.
CPC ................ *B64C 1/00* (2013.01); *B64C 1/066* (2013.01); *B64C 1/18* (2013.01); *B64C 2001/009* (2013.01)

(58) Field of Classification Search
CPC .. B64C 1/00; B64C 1/066; B64C 1/18; B64C 2001/009

(Continued)

(56) References Cited

U.S. PATENT DOCUMENTS 4,383,666 A     5/1983   Allerding et al.
5,118,053 A     6/1992   Singh et al.
(Continued)

FOREIGN PATENT DOCUMENTS

DE   102004009017   8/2005
DE   102005063076   7/2007
(Continued)

OTHER PUBLICATIONS

European Search Report, dated Aug. 4, 2017, parallel application.
German Search Report, dated Nov. 28, 2016, priority document.

*Primary Examiner* — Gregory L Huson
*Assistant Examiner* — Dana K Tighe
(74) *Attorney, Agent, or Firm* — Greer, Burns & Crain, Ltd.

(57) ABSTRACT

A decompression device has at least one decompression member which is arranged on a supporting structure and which, in the event of differential pressure of a predetermined level, opens an opening in the supporting structure that acts as a connection between two volumes, wherein the decompression member can move between a retention position, in which the decompression member closes the opening, and a released position, in which the decompression member opens the opening, and has a locking arrangement which, when in use, fixes the decompression member in the retention position. The locking arrangement is provided with at least one locking element, which is arranged on the supporting structure, and the decompression member is kept in the retention position indirectly by the locking element interacting with an air conduction part.

18 Claims, 3 Drawing Sheets

(58) Field of Classification Search
USPC .......................................................... 454/76
See application file for complete search history.

(56) References Cited

U.S. PATENT DOCUMENTS

| | | | |
|---|---|---|---|
| 8,393,577 B2 * | 3/2013 | Roth | ........................ B64C 1/066 |
| | | | 244/118.5 |
| 2006/0048449 A1 | 3/2006 | Roques et al. | |
| 2009/0179110 A1 | 7/2009 | Leyens | |
| 2010/0320318 A1 | 12/2010 | Roth et al. | |
| 2014/0227957 A1 | 8/2014 | Kelnhofer | |

FOREIGN PATENT DOCUMENTS

| | | |
|---|---|---|
| DE | 102009025382 | 12/2010 |
| DE | 102009060205 | 12/2010 |
| EP | 0420306 | 4/1991 |
| EP | 1976752 | 12/2009 |

\* cited by examiner

DECOMPRESSION DEVICE

CROSS-REFERENCES TO RELATED APPLICATIONS

This application claims the benefit of the German patent application No. 10 2016 205 894.0 filed on Apr. 8, 2016, the entire disclosures of which are incorporated herein by way of reference.

FIELD OF THE INVENTION

The invention relates to a decompression device comprising at least one decompression member which is arranged on a supporting structure and which, in the event of differential pressure of a predetermined level, opens an opening in the supporting structure that acts as a connection between two volumes, the decompression member being able to move between a retention position, in which the decompression member closes the opening, and a released position, in which the decompression member opens the opening, and comprising a locking arrangement which, when in use, fixes the decompression member in the retention position.

BACKGROUND OF THE INVENTION

Decompression devices of this kind are known and used to bring about pressure compensation for air ratios between separated volumes in aircraft. Pressure compensation may be required between separated volumes inside an aircraft fuselage, for example between a vehicle cabin, designed as a passenger cabin, and a hold. Supporting structures may include, for example, wall portions or base parts. In this case, a flexible design is desirable because this means that a decompression device can be provided that is adapted to a range of conditions.

SUMMARY OF THE INVENTION

One idea of the present invention is developing the aforementioned decompression devices such that the devices can be produced in an economical manner, are easy to install and service, and ensure flexible locking and activation while at the same time having a low weight.

This idea is realized by providing the locking arrangement with at least one locking element, which is arranged on the supporting structure, and also by the decompression member being kept in the retention position indirectly by the locking element interacting with an air conduction part. By means of a locking arrangement having a simple structure, a decompression device is thus achieved which can be produced in an economical manner, is easy to install and service, and ensures simple handling and activation while at the same time having a low weight. As will become clear from the following, this decompression device does not require many coupling points or hinges, for example, and springs for moving locking elements can be completely dispensed with. This means that the decompression device is activated properly by means of the locking arrangement and is not very susceptible to faults and failure.

In another embodiment, in the decompression device according to the invention, the locking element of the locking arrangement can be arranged on one side of the supporting structure, in particular on the side which extends in the direction in which the decompression member can be or is moved into the released position. This means that the decompression member can be held by means of pressure applied by the locking arrangement against the dead weight of the decompression member or a biasing force, and therefore components under tensile stress are not at risk of yielding thereto.

In a further embodiment, on the decompression device according to the invention, the locking element can be fastened to or held on the supporting structure and/or molded on the supporting structure or formed integrally with the supporting structure as part thereof, as a result of which the supporting structure, which is in any case rigid, is provided with an abutment which acts as a lock in the locking arrangement and is likewise rigid or only very slightly flexible. Allowing for a locking arrangement part of this kind when creating the supporting structure therefore requires minimal effort and the part can be subsequently attached, which means that, where required, the decompression device can be retrofitted in a simpler manner.

In another development of the decompression device according to the invention, the locking element of the locking arrangement can be formed by a profiled part, in particular a Z-shaped profiled part, which, together with the wall portion, forms at least one engagement element. For example, an opening towards the decompression member in a profiled part of this kind can form an insertion direction for an insertable latch part of the locking arrangement, the longitudinal extension of which latch part, when inserted, then extends substantially in parallel with the supporting structure or decompression member. Other profilings having openings of different shapes are however also conceivable. In particular, on the engagement element, the locking element can be connected, in the position of use, to an engagement part, acting as the mating part of the locking arrangement, in an inserted, snap-fitted or latched manner, which connection can be released when differential pressure is applied to the decompression device. For example, a plurality of engagement elements that participate in a variety of connections can be provided on the profiled part.

In a further development of the decompression device, the locking arrangement can be provided with a plurality of locking elements that are spaced apart on the supporting structure, in particular evenly spaced thereon, such that the retaining force exerted on the decompression member is evenly distributed or such that, conversely, the counter force exerted by the decompression member can be evenly introduced into the supporting structure.

A decompression device designed in another manner may have at least one decompression member, which is pivotable between the retention position and the released position. As a result, the decompression member is pivotally held in at least one region of the supporting structure, for example by means of joints or hinges, and, despite thus being movable, is rigidly connected to the supporting structure and can still be moved, in particular pivoted between the retention position and released position thereof, with little force being required. In another development, the at least one decompression member of the decompression device according to the invention can be moved, i.e., pivoted, in a particularly simple manner by the decompression member being biased in the retention position.

In a further embodiment of the decompression device according to the invention, the air conduction part can be provided as a substantially flat, plate-like component, the fixed end of which can be or is connected to the supporting structure. If shaped appropriately, a component of this kind can be used on the supporting structure to form channels for air flows or the like. In this respect, baffle plates, for example, may also be provided inside a channel of this kind for conducting or diverting flows. In this respect, interaction with the decompression member can, where necessary, open structures provided in any case for the purpose of transporting flows, in order to promote pressure compensation.

In another development of the decompression device, the air conduction part can be flexible and/or resilient and, in the position of use, curved and/or bent towards the decompression member. When the decompression member is released by disengaging the locking arrangement, the basic shape of the air conduction part can relax, which shape is not necessarily planar, but may also be curved. If the air conduction part curves further towards the decompression member and/or the locking arrangement comprising the locking element, this in turn generates bias, which makes it easier to trigger pressure compensation once the locking arrangement has been disengaged. The interaction between the air conduction part and the decompression member in the retention position can be achieved by the free end of the air conduction part protruding, in the position of use, towards the decompression member and pushing against an edge region of the decompression member that faces the air conduction part.

In a further embodiment, the air conduction part can comprise, at the free end thereof, a latch part which, in the retention position, is engaged with the locking element of the locking arrangement. When the locking arrangement is disengaged, the locking element and the latch part are brought out of engagement. In this respect, the release of the decompression member is triggered when a difference in pressure between the two flat sides of the air conduction part exceeds a predetermined value, and therefore the two components of the locking arrangement, i.e., the locking element and the latch element, are brought out of engagement because, for example, the higher pressure on one side of the air conduction part acts in the opposite direction to the insertion direction of the engagement element on a locking element designed as a Z-shaped profiled part. In this case, a first choice with respect to the difference in pressure which releases the decompression member from the retention position thereof can be made on the basis of the degree to which the air conduction part is biased.

In a further embodiment of the decompression device according to the invention, the air conduction part can comprise, at the free end thereof, a damping means which is engaged around the end face thereof along the longitudinal extension thereof, and which, when the decompression member is in the retention position, contacts the edge region of the decompression member. In this way, the damping means, on the one hand, contributes to the amount of force to be applied for activation purposes and, on the other hand, dampens the smallest of movements of the decompression member by means of jolts and reduces the amount of noise resulting therefrom. In this respect, the damping means can form at least one adjustable frictional lock, in particular exactly one adjustable frictional lock, when in abutment against the decompression member over the width thereof. It is also conceivable for a plurality of frictional locking points to be distributed along the width of the decompression member.

In another development of the decompression device according to the invention, the latch part is formed by a pin or a similar projection which protrudes from the free end of the air conduction part and engages in an engagement element of the locking element in the retention position. In this case, the projection together with the air conduction part forms an angle which can substantially be a right angle for example; however, the projection may also curve slightly, in the manner of a hook for example.

The precise design of the damping part having the frictional lock thereof on the edge region of the decompression member, and the material, strength and curvature or bias of the air conduction part provide, in this case, together with the bias of the decompression member, a precisely defined operating region for opening the opening in the supporting structure at a particular differential pressure and, in this respect, provide the criteria for the level of differential pressure itself.

In a further development of the decompression device, the damping means and the latch part can be molded on the free end of the air conduction part, be in abutment against one another, be interconnected and/or be formed in one piece.

The embodiments and developments above can, where appropriate, be combined with one another as desired. Further possible embodiments, developments and implementations of the invention also include combinations not explicitly mentioned of features of the invention which are described above or in the following in relation to the embodiments. In particular, in this case, a person skilled in the art will also add individual aspects as improvements or additions to the relevant basic form of the present invention.

BRIEF DESCRIPTION OF THE DRAWINGS

The invention is explained in greater detail in the following, with reference to embodiments shown in the drawings. In this case, in partially schematic drawings.

In all the drawings, like or functionally like elements and devices have been provided with the same reference numerals unless specified otherwise.

DETAILED DESCRIPTION OF THE PREFERRED EMBODIMENTS

Figures 1, 2:
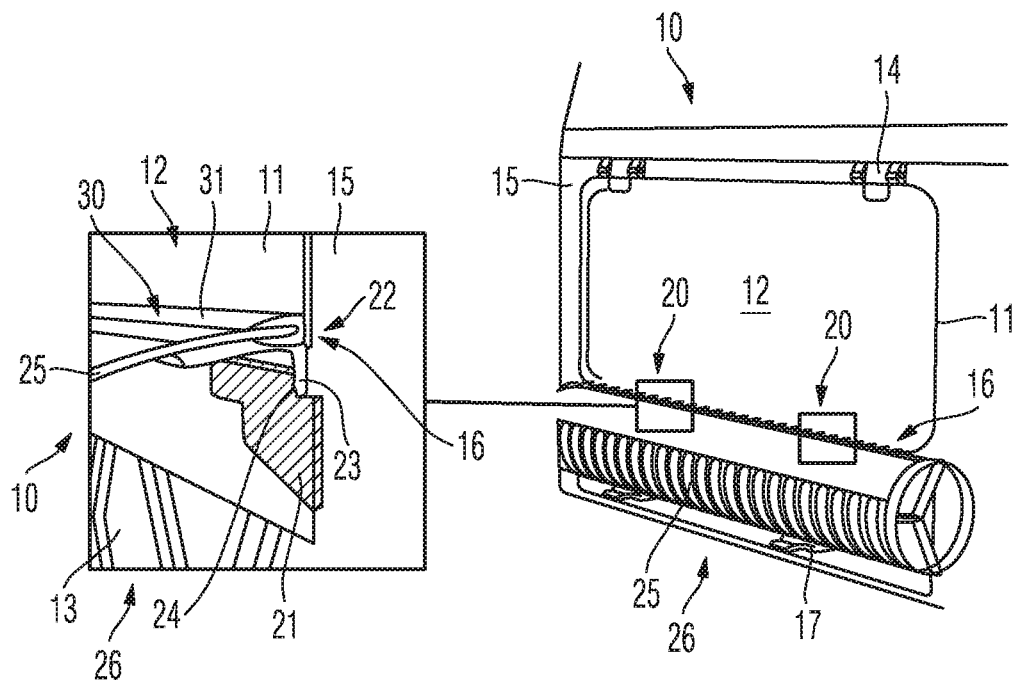
FIG. 1 is a perspective side view of a first embodiment of the decompression device according to the invention.
FIG. 2 is a sectional perspective view of a detail from the view of FIG. 1, showing the locking arrangement in more detail.

FIGS. 1-3d show decompression devices, which are denoted, in each case, by reference numeral 10 as a whole, each comprising one decompression member 11 which is arranged on a supporting structure 15 and which, in the event of differential pressure of a predetermined level, opens an opening 12 in the supporting structure 15 that acts as a connection between two volumes, the decompression member 11 being able to move, in each case, between a retention position, in which the decompression member closes the opening 12, and a released position, in which the decompression member opens the opening 12, and comprising a locking arrangement 20 which, when in use, fixes the decompression member 11 in the retention position.

FIGS. 1-3d show, in particular, that the locking arrangement 20 is provided with at least one locking element 21, which is arranged on the supporting structure 15, and that the decompression member 11 is kept in the retention position indirectly by the locking element 21 interacting with an air conduction part 25.

In this regard, a supporting structure 15 can first be seen in FIG. 1, which supporting structure is provided with a substantially rectangular opening 12 which has rounded corners and is completely covered by the decompression member 11 in the shown position of use or retained position, the decompression member 11 being pivotally held on the long side thereof remote from the locking arrangement 20 by means of two hinges 14.

Below the downwardly-facing edge region 16 of the decompression member as seen by the viewer, FIG. 1 shows a channel structure 26, in which, when used as intended, a constant air flow, for example of an air conditioning system (not shown in greater detail) of the aircraft, exerts a constant pressure on the air conduction part 25 substantially forming the channel structure 26. This part is arranged and held on the supporting structure by clamp-like retaining means 17. Furthermore, the air conduction part 25 is a flat, plate-shaped component having a substantially even curvature and is biased in the position of use thereof to a predetermined degree, and this contributes to a release process which comes after a process for disengaging the locking arrangement 20, which will be described in even more detail below.

In this regard, the view from FIG. 2 shows the locking arrangement in greater detail. This figure shows that a plurality of locking elements 21 are arranged on the supporting structure 15 and are positioned along the edge region 16 of the decompression member 11 so as to be adjacent thereto.

The locking elements 21 are designed as Z-shaped profiled parts and comprise an engagement element 24 which is open towards the decompression member 11 and in which a projection 23 of a latch part 22 engages when the decompression member 11 is in the retained position.

In this case, the air conduction part 25 which is curved towards the decompression member comprises, on its free end, the projection 23 which, in the position of use thereof or when the decompression member 11 is in the retention position, extends substantially in parallel with the decompression member 11 and the supporting structure 15 in a manner in which the projection protrudes from the free end of the air conduction part 25.

Furthermore, a collar 31 acting as a damping means 30 can be seen on the free end of the air conduction part 25, which collar 31 engages around the end face of the air conduction part 25 and extends, in the edge region thereof, in a planar manner and along both side faces at a short distance from the end face. The cross section of the collar 31, which is at its maximum on the end face of the air conduction part 25 and is tear-shaped, for example, tapers outwards from the free end of the air conduction part. The collar 31 is molded on the projection 23 on the side of the collar that points downwards in the position of use, and the end face of the collar also contacts the edge region of the decompression member 11 in a frictional lock. The decompression member 11 is kept in the retention position thereof as a result of this contact because, owing to the bias thereof, when engaged, the projection 23 is pushed against the inside of the profiled part portion that protrudes upwards, and thus stays in engagement with the profiled part of the locking element 21 of the locking arrangement 20.

Finally, FIG. 2 also shows that an arrangement of honeycombed passages 13 is located on the supporting structure 15 below the locking arrangement 20 as seen by the viewer, by means of which passages air from the remote volume inside a fuselage as seen by the viewer can be drawn into the channel structure 26. The passages 13 are thus dimensioned such that an operator can reach through the passages with their fingers so that the free end of the air conduction part can be taken out of the released position thereof and fixed in the retained position once again, for example. Air which is introduced or suctioned into the channel structure 26 from the aforementioned volume as a result of a difference in pressure is conducted away by means of a guide element 27, which upwardly protrudes into the channel structure 26 substantially in parallel with the longitudinal extent thereof, as can be seen more clearly in FIG. 3a, which, for that matter, shows the same situation as that shown in FIGS. 1 and 2.

Figure 3A:
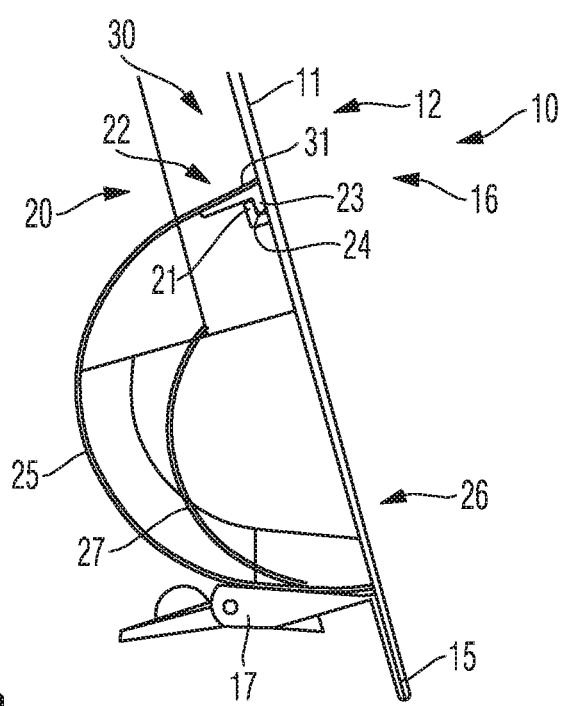
FIGS. 3a-d are four sectional side views in the chronological order of a process for disengaging the locking arrangement, during which the decompression element is transferred from the retention position into the released position.

FIGS. 3a-3d show, in chronological order, the process for disengaging a locking arrangement 20 of the decompression device 10 according to the invention. In this case, FIG. 3a shows the situation from FIGS. 1 and 2, in which the decompression member 11 of the decompression device 10 is in the retention position thereof and, on the locking arrangement 20, the projection 23 of the latch part 22 engages in the engagement element 24 of the profiled part of the locking element 21, as a result of which the end face of the free end of the air conduction part 25 strikes against the edge region 16 of the decompression member 11 by the collar 31 of the air conduction part, the collar acting as a damping means, and fixes the decompression member in the retention position. This means that the decompression member 11 is held indirectly by the locking element 21 interacting with the air conduction part 25.

Figure 3B:
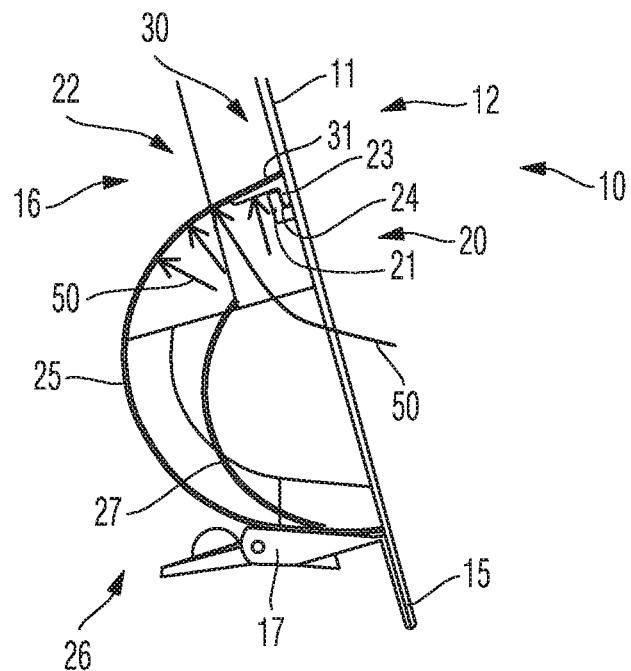

In FIG. 3b, the mechanical state of the decompression device remains unchanged in respect of the arrangement of its components; the arrow 50 can be seen, which is intended to indicate the pressure exerted in the event of differential pressure on the region of the air conduction part 25 that is close to the supporting structure and on the locking arrangement 20, or the oncoming direction of these parts.

Figure 3C:
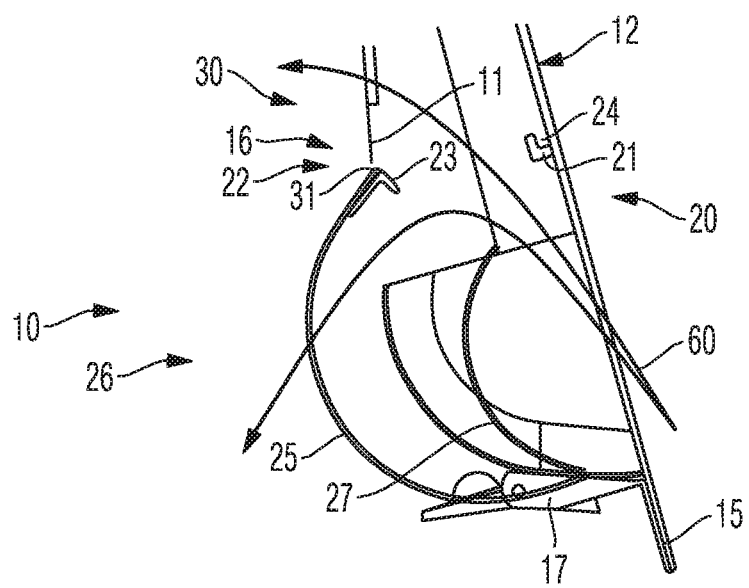

As a result of the pressure exerted by the flow or the sudden difference in pressure, in FIG. 3c, the projection 23 of the locking part 22 is brought out of engagement with the profiled part 24 of the locking element 21, since the free end of the air conduction part 25 moves by the collar 31 thereof, despite frictional locking, on the edge region of the decompression member 11 in parallel therewith approximately until the profiled piece portion of the profiled part 24 that is parallel to the projection in the retained position can no longer hold the air conduction part thereagainst and can no longer keep the decompression part in the biased state. FIG. 3c shows the moment when the end region 16 of the decompression member that was previously impinged upon has just been freed from the end region of the air conduction part 25 that was previously holding it, while the decompression member is pivoting into the released position thereof. The locking is thus released, as a result of which the decompression member 11 pivots on the hinges thereof (not shown in FIG. 3c), whereas the air conduction part 25 pivots back to the retaining means 17 and the curvature thereof is at the same time brought out of the biased state into the relaxed state. These movement states of the air conduction part 23 and decompression member are indicated by the movement arrows 60.

Figure 3D:
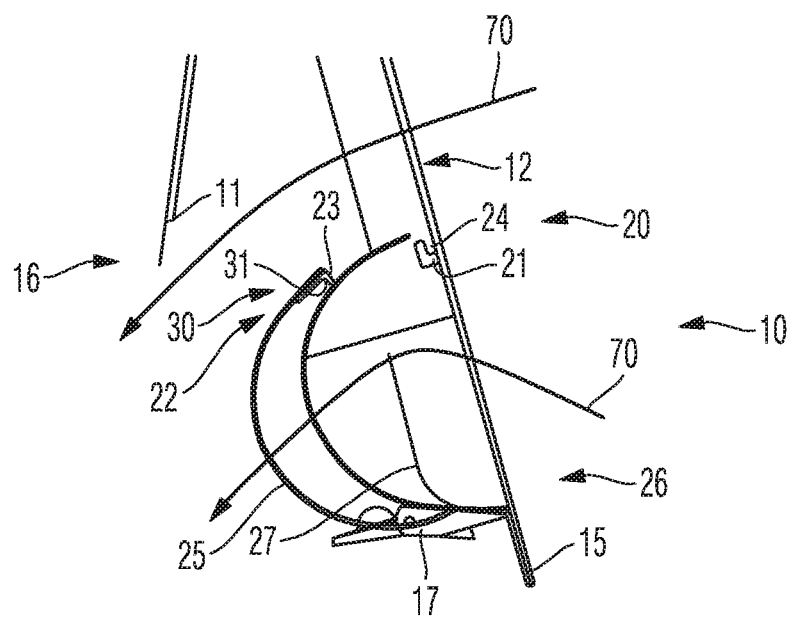

Finally, FIG. 3d shows the decompression device 10 in the released position of the decompression member 11, the air conduction part 25 simultaneously being in a relaxed state. The arrows 70 indicate the flow paths that are possible, depending on the differential pressure event, for compensating for pressure on the two volumes, in particular by means of the opened opening 12, but also by means of a grid structure 28 arranged on the air conduction part 25 in a region facing the supporting structure 15.

The invention described above therefore relates to a decompression device 10 comprising at least one decompression member 11 which is arranged on a supporting structure 15 and which, in the event of differential pressure of a predetermined level, opens an opening 12 in the supporting structure 15 that acts as a connection between two volumes, the decompression member 11 being able to move between a retention position, in which the decompression member closes the opening 12, and a released position, in which the decompression member opens the opening 12, and comprising a locking arrangement 20 which, when in use, fixes the decompression member 11 in the retention position.

In order to provide a decompression device 10 which can be produced in an economical manner, is easy to install and service, and ensures flexible locking and activation while at the same time having a low weight, it is proposed that the locking arrangement be provided with at least one locking element 21, which is arranged on the supporting structure 15, and that the decompression member 11 be kept in the retention position indirectly by the locking element 21 interacting with an air conduction part 25.

Although the present invention has been disclosed in the above with reference to various embodiments, it is not limited thereto, but can be modified in various ways. In particular, the invention can be varied or modified in a range of ways without departing from the central concept of the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A decompression device comprising:
   at least one decompression member which is locatable on a supporting structure and which, in the event of differential pressure of a predetermined level, is configured to open an opening in the supporting structure that acts as a connection between two volumes, wherein the decompression member can move between a retention position, in which said decompression member closes the opening, and a released position, in which said decompression member opens the opening, and
   a locking arrangement which, when in a locking position, fixes the decompression member in the retention position, wherein the locking arrangement is provided with at least one locking element, which is locatable on the supporting structure, and
   wherein the decompression member is kept in the retention position indirectly by the locking element interacting with an air conduction part,
   wherein the air conduction part comprises, at a free end thereof, a latch part, which, in the retention position, is engaged with the locking element and forms, together with said locking element, the locking arrangement,
   wherein the latch part is formed by a pin or a similar projection which protrudes from the free end of the air conduction part and engages in an engagement element of the locking element in the retention position.

2. The decompression device of claim 1, wherein the at least one locking element of the locking arrangement is configured to be locatable on one side of the supporting structure.

3. The decompression device of claim 2, wherein the locking arrangement is configured to be locatable on the side which extends in a direction in which the decompression member can be or is moved into the released position.

4. The decompression device of claim 1, wherein the at least one locking element is configured to be at least one of fastened to or held on the supporting structure, is molded on the supporting structure, or is formed integrally with the supporting structure as part thereof.

5. The decompression device of claim 1, wherein the at least one locking element of the locking arrangement is formed by a profiled part, which, together with the supporting structure, forms at least one engagement element.

6. The decompression device of claim 5, wherein the at least one locking element of the locking arrangement is formed by a Z-shaped profiled part.

7. The decompression device of claim 1, wherein, in the locking position, the at least one locking element is connected to an engagement element in an inserted, snap-fitted or latched manner.

8. The decompression device of claim 1, wherein a plurality of locking elements are provided on the locking arrangement and are spaced apart on the supporting structure.

9. The decompression device of claim 8, wherein the plurality of locking elements are evenly spaced on the supporting structure.

10. The decompression device of claim 1, wherein the decompression member is biased in the retention position.

11. The decompression device of claim 1, wherein the decompression member is pivotable between the retention position and the released position.

12. The decompression device of claim 1, wherein the air conduction part is a substantially flat, plate-like component, a fixed end of which can be or is connected to the supporting structure.

13. The decompression device of claim 1, wherein the air conduction part is least one of flexible or resilient and, in the retention position, is at least one of curved or bent towards the decompression member.

14. The decompression device of claim 1, wherein the air conduction part comprises, at a free end thereof, a damping means which is engaged around an end face thereof and which, when the decompression member is in the retention position, contacts an edge region of said decompression member.

15. The decompression device of claim 14, wherein the damping means forms at least one adjustable frictional lock, when in abutment against the decompression member over a width thereof.

16. The decompression device of claim 15, wherein the damping means forms exactly one adjustable frictional lock.

17. A decompression device comprising:
   at least one decompression member which is locatable on a supporting structure and which, in the event of differential pressure of a predetermined level, is configured to open an opening in the supporting structure that acts as a connection between two volumes, wherein the decompression member can move between a retention position, in which said decompression member closes the opening, and a released position, in which said decompression member opens the opening, and a locking arrangement which, when in use, fixes the decompression member in the retention position wherein the locking arrangement is provided with at least one locking element, which is locatable on the supporting structure, and wherein the decompression member is kept in the retention position indirectly by the locking element interacting with an air conduction part, wherein the air conduction part comprises, at a free end thereof, a latch part which, in the retention position, is engaged with the locking element and forms, together with said locking element, the locking arrangement, wherein the air conduction part comprises, at a free end thereof, a damping means which is engaged around an end face thereof and which, when the decompression member is in the retention position, contacts an edge region of said decompression member, wherein the damping means and the latch part are molded on the free end of the air conduction part, are at least one of in abutment against one another, interconnected, or formed in one piece.

18. A decompression device comprising:

at least one decompression member which is locatable on a supporting structure and which, in the event of differential pressure of a predetermined level, is configured to open an opening in the supporting structure that acts as a connection between two volumes, wherein the decompression member can move between a retention position, in which said decompression member closes the opening, and a released position, in which said decompression member opens the opening, and a locking arrangement which, when in use, fixes the decompression member in the retention position, wherein the locking arrangement is provided with at least one locking element, which is locatable on the supporting structure, and wherein the decompression member is kept in the retention position indirectly by the locking element interacting with an air conduction part, wherein the at least one locking element of the locking arrangement is formed by a profiled part, which, together with the supporting structure, forms at least one engagement element, wherein the at least one locking element of the locking arrangement is formed by a Z-shaped profiled part, wherein the air conduction part comprises, at the free end thereof, a latch part which, in the retention position, is engaged with the locking element and forms, together with said locking element, the locking arrangement, wherein the latch part is formed by a pin or a similar projection which protrudes from the free end of the air conduction part and engages in an engagement element of the locking element in the retention position.

* * * * *